United States Patent Office 3,143,358
Patented Aug. 4, 1964

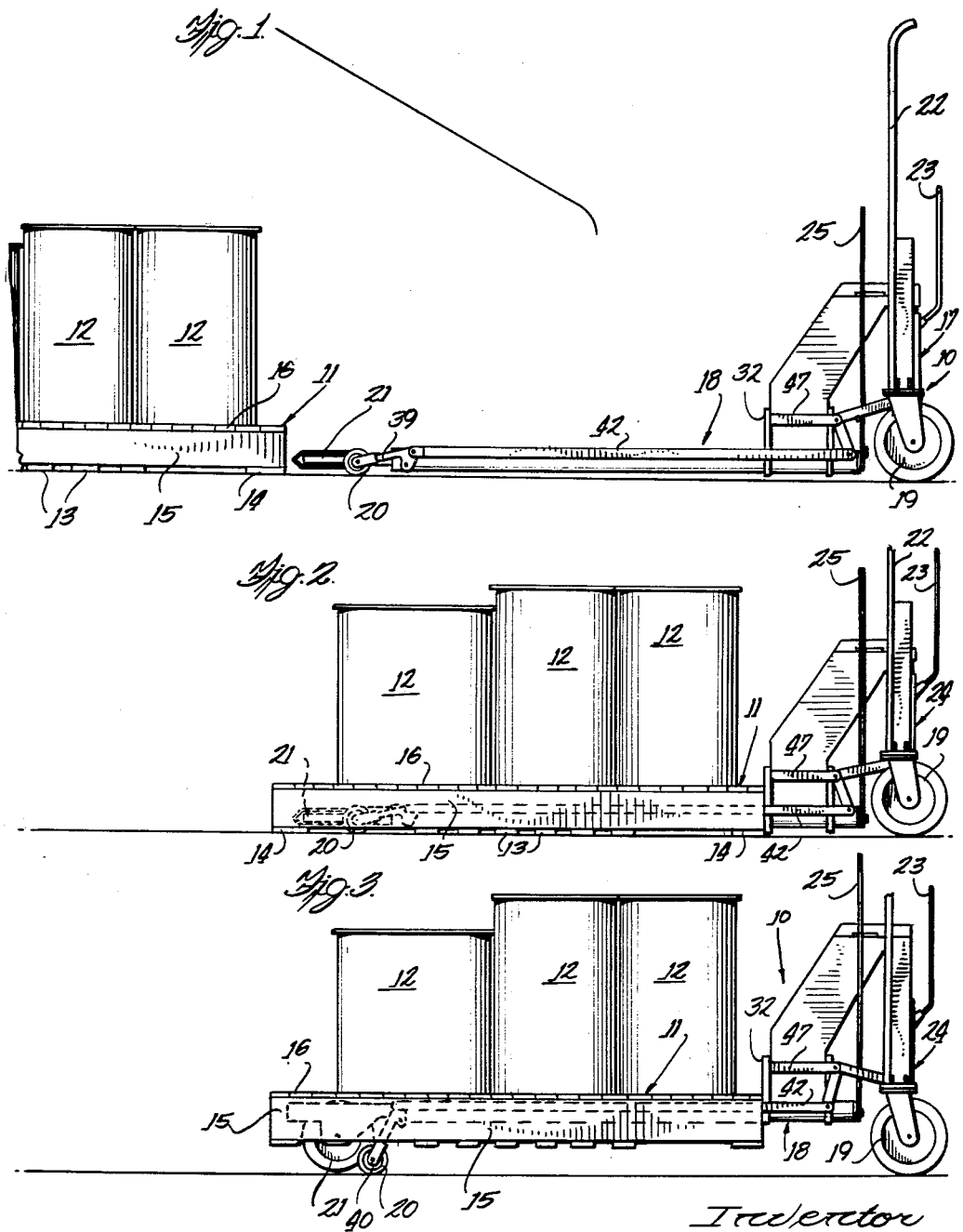

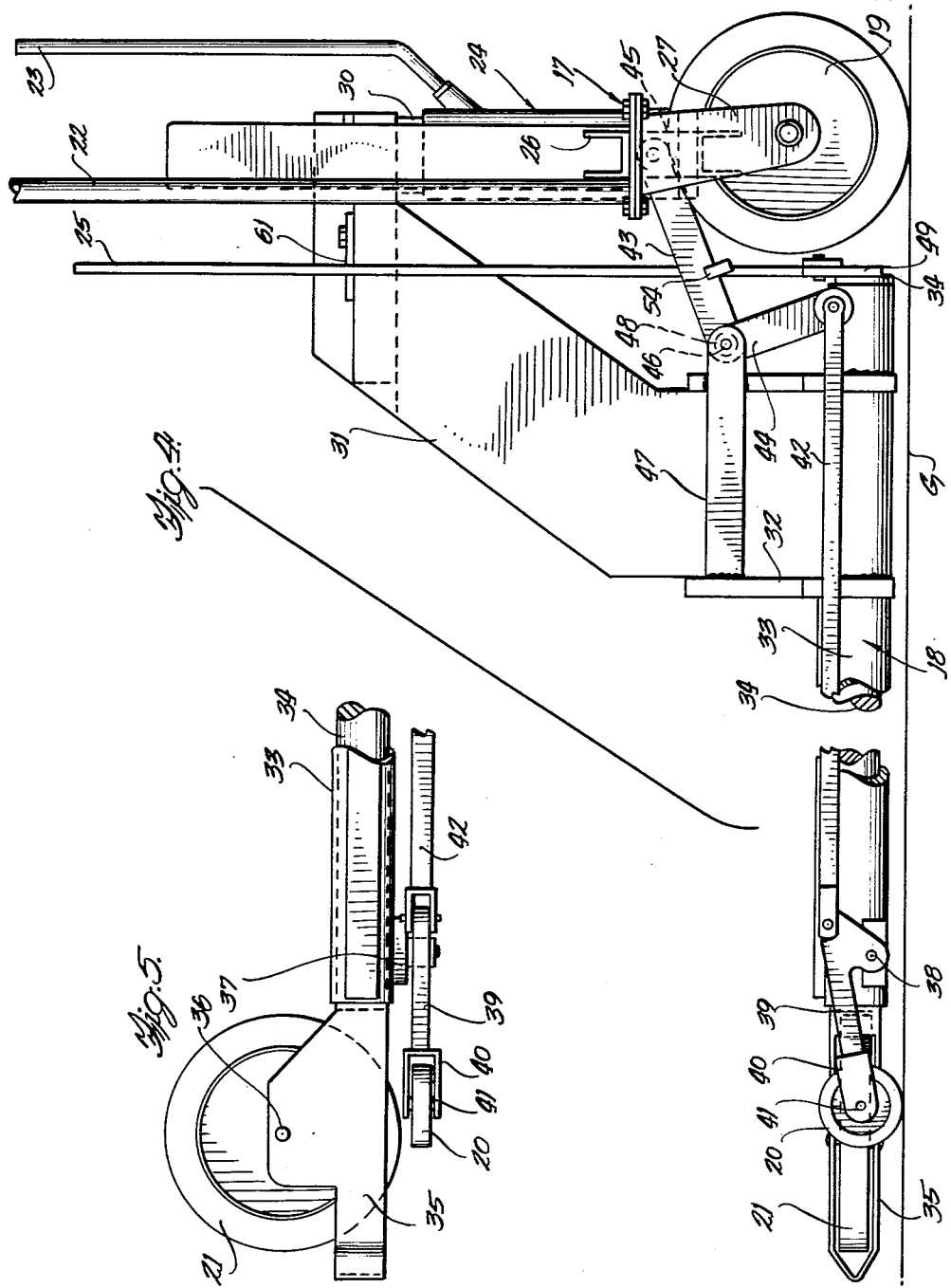

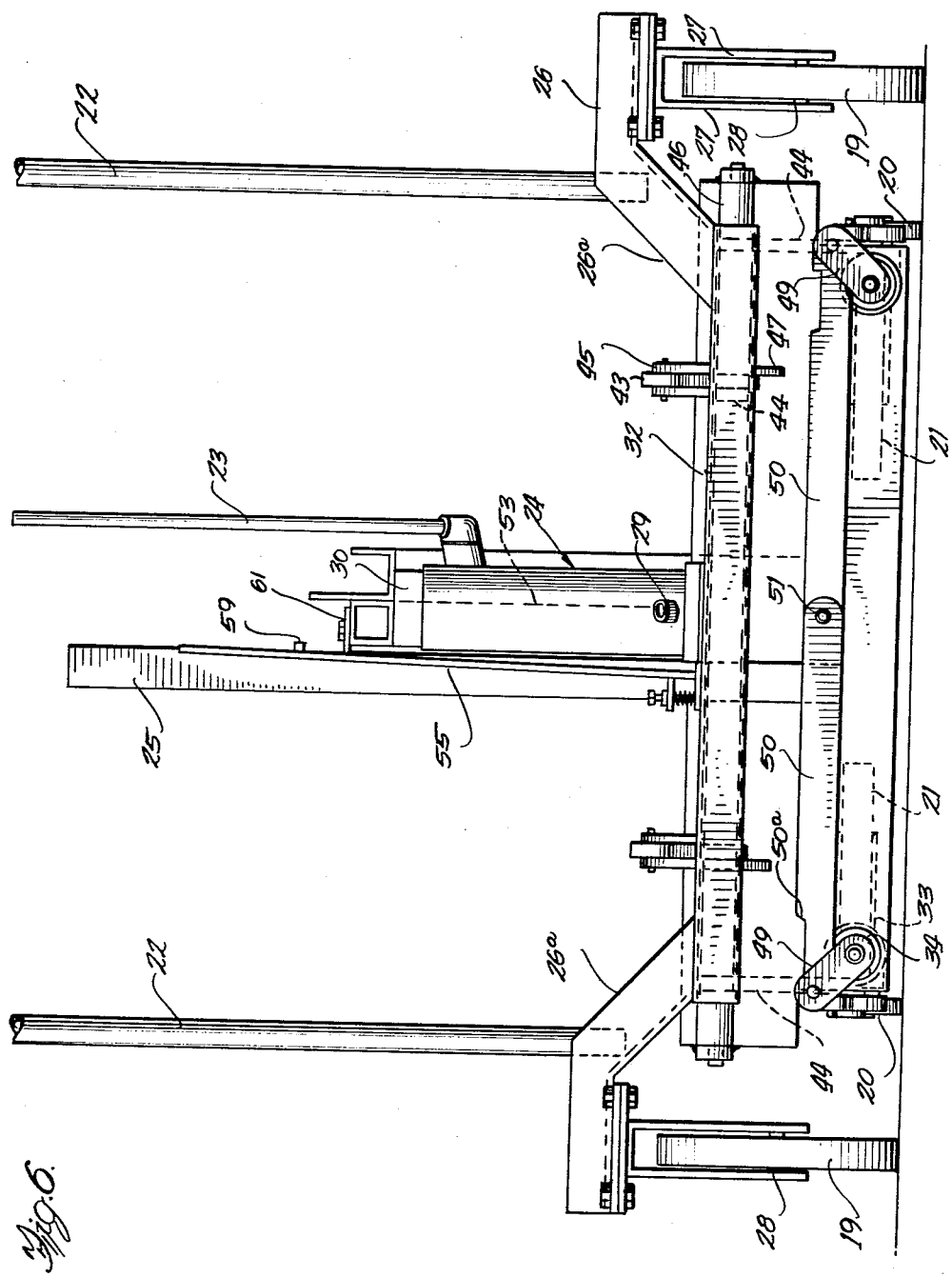

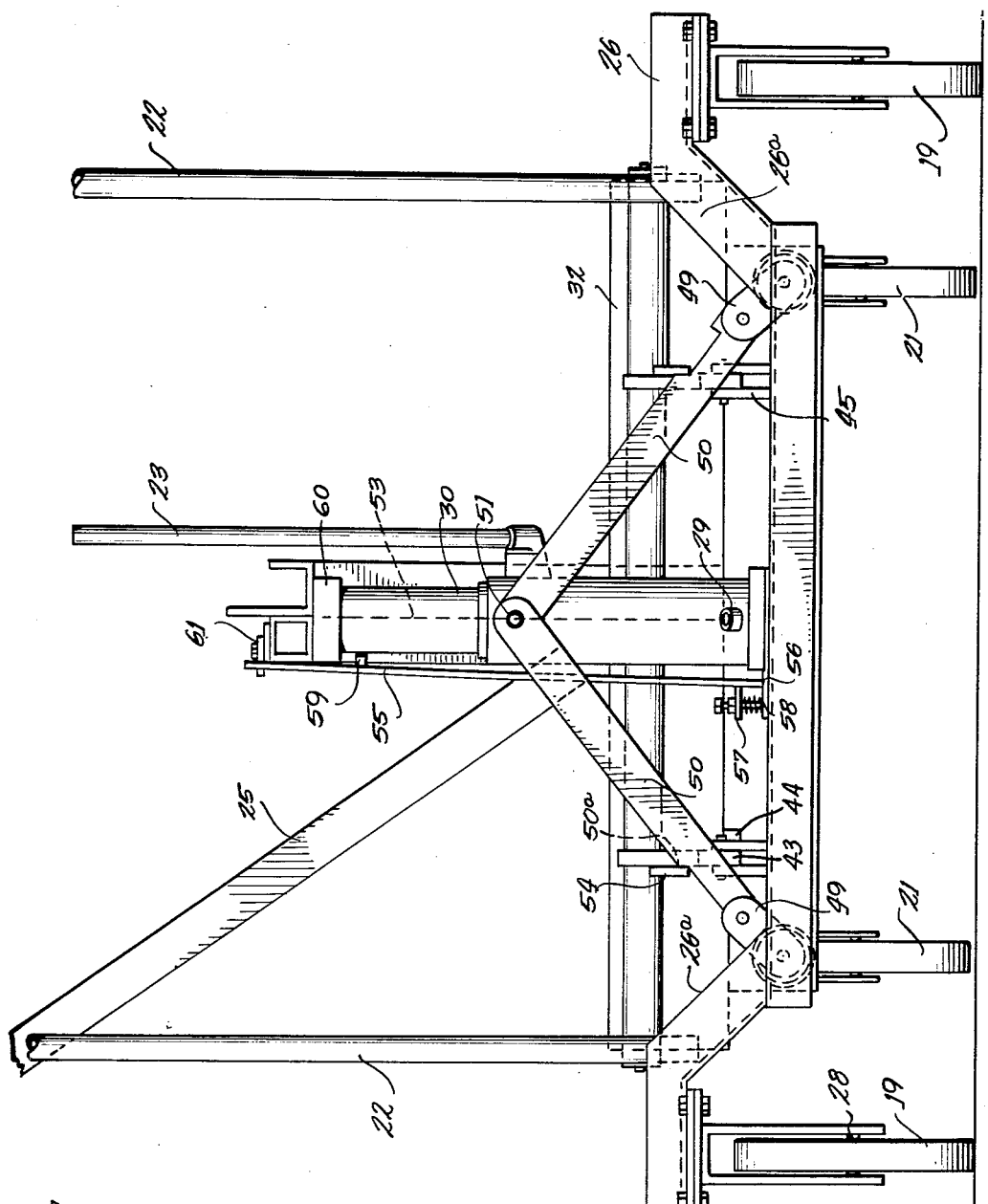

3,143,358
PALLET TRUCK
Warren Du Broff, 305 Carol Court, Highland Park, Ill.
Filed June 14, 1962, Ser. No. 202,613
2 Claims. (Cl. 280—43.5)

This invention relates to a pallet truck, and, more particularly, to a hand-propelled truck which is adapted to be inserted between the upper and lower cross members of a load-supporting pallet.

The environment in which the invention finds utility is in warehousing and other storage operations wherein wooden pallets are normally employed to temporarily support loads, such as cans, drums, packages, etc. Conventionally, these pallets are about four feet square and about six inches high, made up of three spaced-apart, parallel 2 x 4's cross tied top and bottom, with 1 x 4's and 1 x 6's.

With pallets of this size, it is possible for one man to truck the loaded pallet from one place in the warehouse to another through the positioning of tines between the upper and lower cross ties—in a fashion analogous to that of a fork-lift truck. However, the invention here is intended for hand operation and there has been a serious disadvantage attendant upon such trucks in the past because of the size of the wheels provided at the inserting end of the "tines." These wheels or rollers must be necessarily small—about three inches in diameter—so as to permit entry of the ties between the upper and lower cross ties. Even though the other wheels on the truck may be of substantial diameter—of the order of eight inches—the load is primarily carried on the small 3" diameter rollers, so that considerable power is required on the part of the operator to move the truck. For this reason, it has been virtually impossible in the past to have women manipulate such hand-operated pallet trucks.

It is a principal object of this invention to provide a novel pallet truck which overcomes the above-mentioned difficulties and which provides a readily operable truck advantageously arranged so that a woman of moderate strength can pull the load without exertion that heretofore would have taxed the strength of a strong man.

Another object of the invention is to provide a novel hand-operated pallet truck wherein the inserting ends of the so-called "tines" are equipped with both small and large diameter wheels—the large diameter wheels being pivotable from a horizontal configuration to facilitate insertion of the tines into a pallet, to a vertical condition to carry the load with much less friction.

Still another object is to provide a hand-operated pallet truck embodying a unique system of lever linkages which facilitate raising the load slightly to permit the use of relatively large diameter wheels at all four corners of the pallet truck.

Yet another object is to provide a hand-operated pallet truck wherein linkage systems are employed for first raising the truck "tines" a distance sufficient to utilize larger diameter wheels at the tine ends, and for pivoting these larger wheels into position, the linkage systems embodying interlocks to prevent inadvertent return of the truck to a pallet-insertable condition when the truck is transporting a load.

Other objects and advantages of the invention may be seen in the details of construction and operation set down this specification.

The invention will be explained in conjunction with the accompanying drawing, in which—

FIG. 1 is an elevational view of the truck of the invention in a position about to be inserted into a pallet;

FIG. 2 is a view similar to FIG. 1 but with the truck seen in a position in which it has been inserted into a loaded pallet;

FIG. 3 is a view similar to FIG. 2 but with the truck subframe in an elevated condition for transporting the pallet;

FIG. 4 is an enlarged fragmentary view of the truck in its FIG. 1 condition;

FIG. 5 is an enlarged fragmentary plan view of one of the tine ends as it would appear in its FIGS. 1, 2 and 4 condition;

FIG. 6 is an end elevational view of the truck as it would be seen in its FIG. 1 or FIG. 4 condition;

FIG. 7 is a view similar to FIG. 6 but with the truck in a configuration corresponding to that of FIG. 3.

Figure 8:
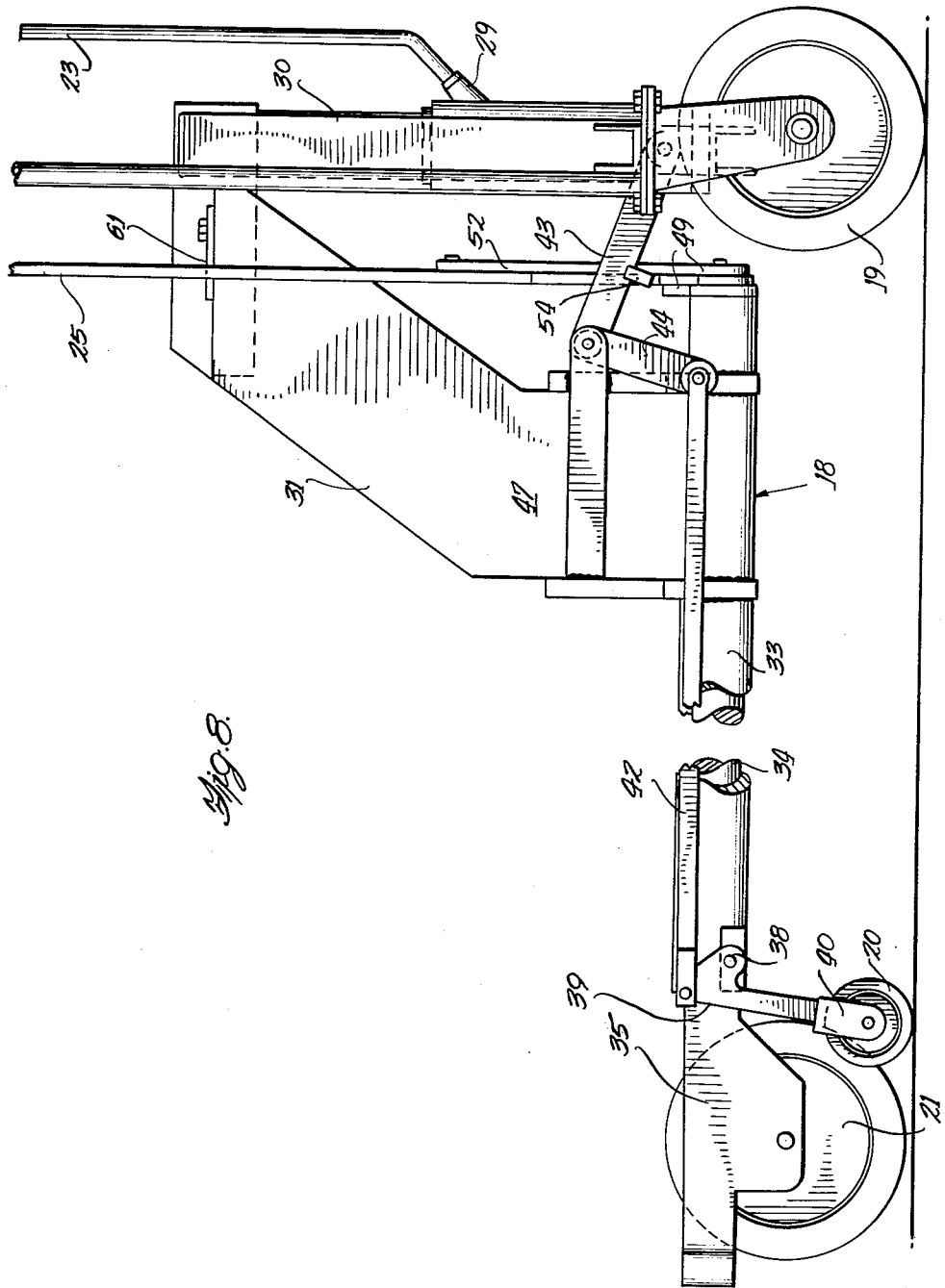
FIG. 8 is a view similar to FIG. 4 but with the truck parts in a condition corresponding to that of FIGS. 3 and 7.

In the illustration given, and with reference to FIG. 1, the numeral 10 designates generally the hand-operated pallet truck of the invention, while the numeral 11 designates generally a pallet carrying lading 12 which is to be transported by the truck 10. A typical pallet 11 is made up from 1 x 4's 13 spaced 2" apart, with each end being equipped with a 1 x 6 14 spaced about 10" from the nearest 1 x 4. The longitudinal stringers 15 are 2 x 4's and the upper layer may be made up of a series of closely spaced 1 x 4's 16.

The truck 10 used for transporting the loaded pallet 11 includes a frame portion generally designated 17 and a subframe portion generally designated 18. The frame portion 17 is equipped at its lower end with large diameter wheels 19, while the subframe 18, at the end thereof remote from the frame 17, is equipped with small diameter wheels as at 20. The subframe 18, at the end equipped with the smaller diameter wheels 20, is also equipped with larger wheels 21 which can be pivoted to the condition seen in FIG. 3 so as to support the lading 12 on large diameter wheels both fore and aft. This materially reduces friction so that considerably less power is required for moving the truck 10.

Generally, the operational sequence for achieving this operation can be visualized from a consideration of the first drawing sheet (FIGS. 1–3), wherein the frame 17 is equipped with an upwardly-extending handle portion 22. By pushing against the handle portion 22, the subframe 18 can be inserted into the pallet 11 as seen in FIG. 2, thereupon the handle 23 is pumped, which forces fluid into a hydraulic cylinder and piston rod unit generally designated 24 so as to elevate the subframe 18. Once the subframe 18 has been elevated from its FIG. 2 to its FIG. 3 condition, the handle 25 is shifted laterally from the FIG. 2 to the FIG. 3 position so as to rotate the larger wheels 21 from their FIG. 2 to their FIG. 3 condition. At this juncture, the after end of the load (the end associated with the wheels 21) is still supported on the smaller wheels 20. By slightly relieving the hydraulic pressure in the cylinder and piston rod unit 24, the subframe 18 is lowered somewhat so as to have all of the weight carried on the wheels 19 and 21. In this condition, the truck is available for relocating the lading 12. To unload the truck, it is only necessary to pump the handle 23 so as to once again bring the apparatus into the FIG. 3 condition where the after end of the lading 12 is supported on the wheels 20. Then the wheels 21 can be pivoted to the FIG. 2 condition and finally the pressure in the hydraulic system, including the cylinder and piston rod unit 24, released to set the pallet 11 on the floor.

To describe the details of construction of the truck 10, reference will first be made to FIGS. 4 and 5 on the second drawing sheet and FIG. 6 on the third drawing sheet, which show the apparatus in its FIG. 2 condition, i.e., with the subframe low and with the larger after wheels 21 being in a position parallel to the ground or floor G.

Referring first to FIG. 4, it will be seen that the frame 17 includes a transverse channel member 26. The channel member, at its ends, provides a rotatable support for an axle bracket 27 supporting the axles 28 upon which the front wheels 19 are mounted. Advantageously, the axle bracket 27 is pivotable about a vertical axis so as to facilitate turning of the truck 10.

As can be best seen in FIG. 6, the cross channel 26 is deformed to provide a lower central portion 26a, and this lower central portion supports the cylinder and piston rod unit 24 which is equipped with the previously-mentioned pump handle 23. The cylinder and piston rod unit 24 is also equipped with a by-pass control 29, which is employed for retracting the piston rod or ram 30 from the condition seen in FIG. 8 to the condition seen in FIG. 6.

Referring again to FIG. 4, it will be seen that the ram 30 is rigidly connected to an angular shaped bracket 31, and the bracket 31, in its depending portion, is connected as by welding to cross braces 32. The cross braces 32 in turn carry a pair of spaced-apart, horizontally-extending, parallel tubes 33 (see also FIG. 5). The tubes 33 rotatably receive shafts 34 (still referring to FIG. 5), and the shafts 34 carry axle brackets 35 at the after ends thereof for the mounting of axles 36 on which the wheels 21 are mounted.

As can be best seen from a comparison of FIGS. 4 and 5, the tubular members 33 are equipped at their after ends with blocks 37 providing pivot mountings for the support of pins 38. Mounted for pivotal movement on each pin 38 is a lever member 39. The lever member 39 carries at its after end an axle bracket 40 supporting an axle 41 on which the smaller wheel 20 is mounted.

To convert the subframe from its FIG. 4 to its FIG. 8 condition, the lever member 39 is rotated counterclockwise about the pin 38 serving as a pivot, and this movement is induced by horizontal motion of a connecting rod 42 which is provided as the third element of a linkage system including links 43 and 44 as the first and second elements, respectively.

The link 43 is pivotally mounted on a pedestal 45 provided in the depressed channel portion 26a. As can be readily seen from FIG. 4, the after end of the first link 43 is pivotally connected to the subframe 18 as at 46, the cross ties 32 carrying a support member 47 for this purpose. The cross member 47 supports a transverse pipe 48 in rotatable fashion which is rigidly connected to the link 43 and to the link 44 so that the included angle between these two links remains the same, as can be appreciated from a consideration of FIG. 4 and FIG. 8. The lower end of the link 44 is pivotally connected to the third link or connecting rod 42. Thus, when the ram 30 is elevated from its FIG. 4 to its FIG. 8 condition, the bracket 31 is raised, thereby raising the subframe 18. Because the first link 43 is fixed against vertical movement at its forward end, the elevation of the subframe 18 causes a clockwise movement of the pipe 48 to dispose the second link 44 in the FIG. 8 condition and thereby effectively extend the third link or connecting rod 42. The lever member 39 is in effect a first class lever, and the extension of the connecting rod 42 causes the wheels 20 to be pivoted counterclockwise to the FIG. 8 condition about the pivot point or fulcrum 38. During this operation, it will be noted that the first link 43 pivots through a horizontal position (compare FIGS. 5 and 8), and, at the exact horizontal position thereof, forces the subframe 18 away from the main frame a slight amount which is tolerable because of the cantilevered mounting of the subframe on the main frame through the employment of the bracket 31. However, in both the lowered and the elevated condition of the subframe 18, the spacing thereof from the frame 10 is about the same.

A second linkage system is employed for pivoting the wheels 21 from their FIG. 6 to their FIG. 7 condition. This linkage system includes as a first link the element 49, which is rigidly connected to the forward end of the tube 34 (see FIGS. 4 and 8). At its other end, each first linkage element 39 is connected to a second linkage element 50, and the second elements 50 are pivotally interconnected as at 51 (see FIGS. 6 and 7). One of the elements 50 is equipped with the handle 25 which is pivotable from the FIG. 6 to the FIG. 7 condition so as to convert the wheels from a horizontal condition to a vertical condition. For this purpose, the subframe 18 is equipped with an upwardly-extending guide 52 (see FIG. 8), in which the pivot pin 51 rides and which is indicated by dotted line as at 53 in FIGS. 6 and 7.

Movement of the handle 25 to the left as seen in FIG. 6 to the position in FIG. 7 causes the second linkage elements 50 to rise and also causes the first linkage elements 39 to rise, thereby turning the shaft 34 and hence the wheels 21.

At this juncture, the wheels 21 are off the ground and opening the control 29 relaxes the first linkage system to the point where the larger wheels 21 take over the support of the after end of the load. When this occurs, the clip 54 fixed to the first linkage arm 43 is lowered somewhat so as to bear against a shoulder 50a provided in the second lever arm 50. Thus, any attempt to pivot the handle 25 clockwise as seen in FIG. 7 is ineffective, and the larger wheels 21 are locked in place. Before the wheels 21 can be rotated to the FIG. 6 condition, it is necessary to slightly elevate the subframe 18 by pumping the handle 23.

Another safeguard is provided in the form of a lock for the ram 30, this being clearly seen in FIG. 7 and designated by the numeral 55. This is a vertically-extending, elongated member which is pivotally connected as at 56 to the cross channel 26. The member 55 is equipped with a rigidly connected clip 57, against which a coiled spring 58 bears to urge the member 55 to the position seen in FIG. 7. Adjacent its upper end, the member 55 is equipped with a lug 59 which is adapted to be engaged by a collar 60 provided on the upper end of the ram 30. As seen in FIG. 7, the collar 60 is somewhat above the lug 59, corresponding to the elevation the wheels 21 are off the ground. Thus, as the ram 30 is lowered somewhat to relax the first linkage system including the elements 42–44, the collar 60 engages the lug 59 to prevent further lowering of the ram 30 while the wheels 21 are in the vertical condition seen in FIG. 7. To urge the member 55 away from the FIG. 7 condition when the wheels 21 are pivoted out of load-carrying position, the bracket 31 is equipped with a latch 61 which is engaged by the handle 25 when the same is moved to vertical condition.

While in the foregoing specification a detailed description of an embodiment of the invention has been set down for the purpose of explanation thereof, many variations in the details herein given may be made by those skilled in the art without departing from the spirit and scope of the invention.

I claim:

1. A pallet truck, comprising
   (A) a generally vertically oriented frame equipped with wheel means at the lower end thereof,
   (B) an elongated subframe connected at one end to said frame and extending generally horizontally,
   (C) means on said frame for elevating said subframe, (D) wheel means on the other end of said subframe, and (E) means on said subframe for rotating said subframe wheel means from a horizontal to a vertical position, said subframe being equipped at said other end with second wheel means, said second wheel means being smaller in diameter than said subframe wheel means, and means on said subframe for pivoting said second wheel means through a vertical arc to elevate said other end of said subframe whereby said subframe wheel means can be rotated into load carrying position.

2. The structure of claim 1 in which said pivoting means includes a lever member equipped with an axle at one end thereof, said second wheel means being rotatably mounted on said axle, said lever member being pivotally fixed to said subframe, said elevating means including a cylinder and piston unit on said frame for elevating said one end of said subframe, and linkage means connecting said lever member and said one end of said subframe for simultaneously elevating both ends of said subframe.

References Cited in the file of this patent

UNITED STATES PATENTS 3,026,089     Meister     Mar. 20, 1962

FOREIGN PATENTS 85,074     Denmark     Feb. 15, 1958